US006712494B1

(12) United States Patent  
Hodge

(10) Patent No.: US 6,712,494 B1
(45) Date of Patent: Mar. 30, 2004

(54) LIGHTED ORNAMENT

(76) Inventor: William M. Hodge, 15 Cherrywood Ct., South Daytona, FL (US) 32119

( * ) Notice: Subject to any disclaimer, the term of this patent is extended or adjusted under 35 U.S.C. 154(b) by 6 days.

(21) Appl. No.: 10/383,208

(22) Filed: Mar. 7, 2003

(51) Int. Cl.$^7$ .......................................... F21W 131/30
(52) U.S. Cl. ...................... 362/565; 362/806; 362/311
(58) Field of Search ................. 362/565, 806, 362/311

(56) References Cited

U.S. PATENT DOCUMENTS

| D132,705 S | * | 6/1942 | Wittmann | D11/106 |
|---|---|---|---|---|
| 5,150,964 A | | 9/1992 | Tsui | 362/251 |
| 5,255,170 A | * | 10/1993 | Plamp et al. | 362/183 |
| D387,448 S | | 12/1997 | Barthelmess | D26/25 |
| D404,837 S | | 1/1999 | Segan | D26/25 |
| D411,319 S | | 6/1999 | Baker | D26/25 |
| D429,351 S | | 8/2000 | Grether | D26/25 |
| D435,921 S | | 1/2001 | Braley et al. | D26/25 |
| D436,419 S | * | 1/2001 | Lin | D26/104 |
| D440,524 S | * | 4/2001 | Robinson | D11/131 |
| D440,674 S | | 4/2001 | Nichols | D26/25 |
| 6,220,742 B1 | * | 4/2001 | Lloyd et al. | 362/565 |
| 6,250,782 B1 | | 6/2001 | Huang | 362/391 |
| D445,515 S | | 7/2001 | Stage et al. | D26/25 |
| D450,260 S | * | 11/2001 | Lee | D11/131 |
| D450,401 S | | 11/2001 | Zachary | D26/25 |
| D464,590 S | * | 10/2002 | Real | D11/165 |
| D475,500 S | * | 6/2003 | Zou | D99/17 |

* cited by examiner

Primary Examiner—Laura K. Tso
(74) Attorney, Agent, or Firm—Paul S. Rooy, P.A.

(57) ABSTRACT

A lighted ornament. The lighted ornament comprises a first tower and a second tower attached to a base. Lights within light bores are disposed within the first tower, the second tower and the base. The first tower, second tower and base are made of light-transmissive material, which may be transparent or translucent, colored or not. A light-transmissive spire may be disposed atop one or both towers. The base may comprise a base upper surface and a base indicia flat disposed at a side of the base upper surface opposite the first tower and the second tower. Base indicia may be inscribed on the base indicia flat, and the lights within the first tower, second tower and/or base imbue the base indicia with a warm, aesthetic aura. An alternate embodiment is disclosed into which existing bulbs may be inserted.

20 Claims, 2 Drawing Sheets

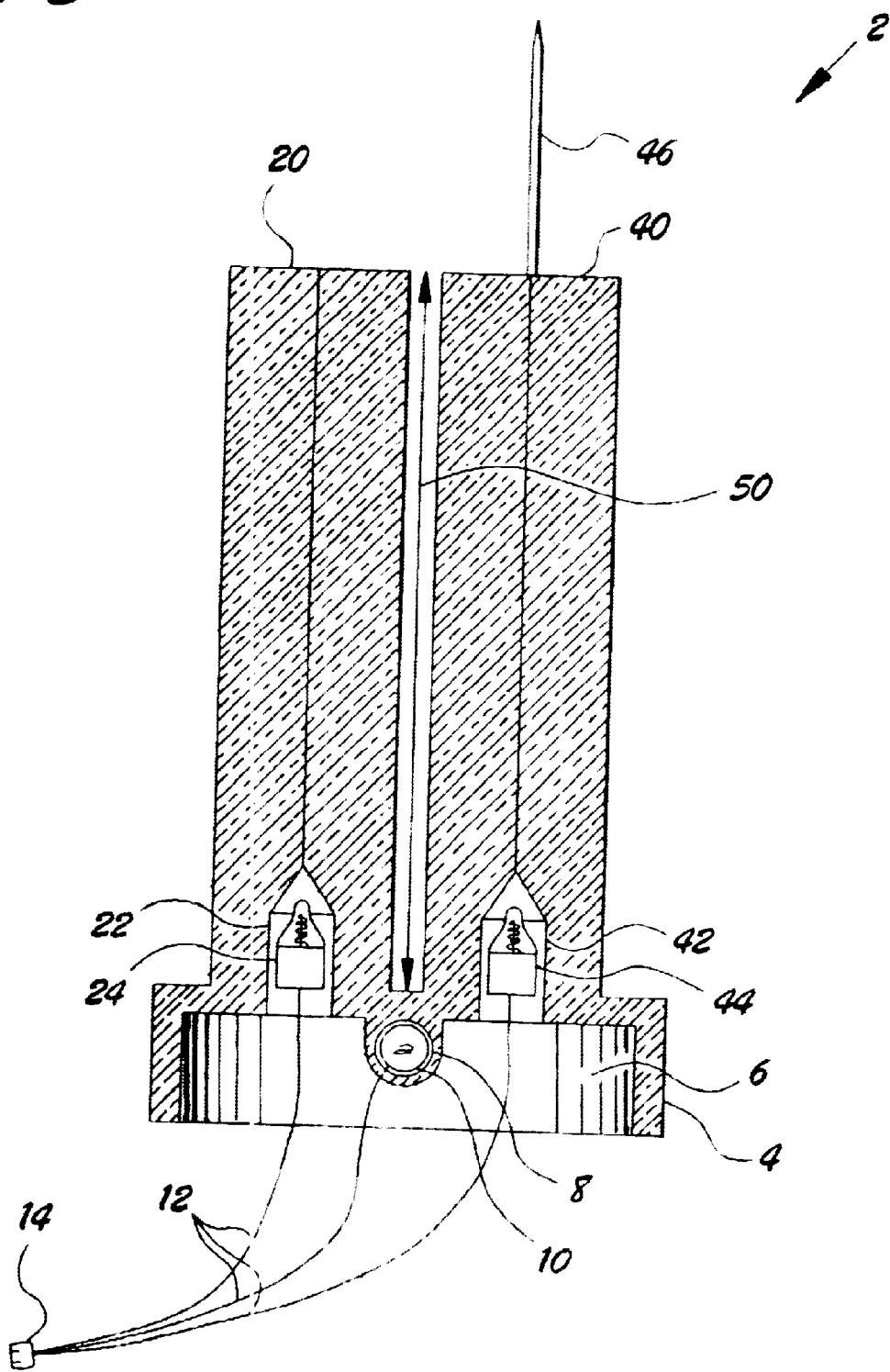

LIGHTED ORNAMENT

BACKGROUND OF THE INVENTION

1. Field of the Invention

This invention relates to ornaments, and in particular to a lighted ornament.

2. Background of the Invention

While a number of lighted ornaments are taught in the prior art, none disclose a pair of lighter building towers. See, e.g., U.S. Pat. No. D445,515, D429,351, D404,837 and Da387,448 which disclose lighted race cars, crosses, televisions and balls, respectively. Stage et al. Thus, it would be desirable to provide a lighted ornament which resembles building twin towers.

SUMMARY OF THE INVENTION

Accordingly, it is an object of the present invention to provide a lighted ornament which resembles a pair of building towers. Design features allowing this object to be accomplished include a first tower and a second tower rigidly attached to a base. Advantages associated with the accomplishment of this object include an aesthetically pleasing ornament which is illuminated from within.

It is another object of the present invention to provide a lighted ornament which may be powered by a conventional Christmas light string female socket. Design features allowing this object to be accomplished include a first tower light, a second tower light, and a base light electrically connected to a connector sized to mate with a conventional Christmas light string female socket. A benefit associated with the accomplishment of this object is ease of use to the consumer.

It is still another object of this invention to provide a lighted ornament which presents an attractive, warm glow. Design features enabling the accomplishment of this object include a first tower, second tower and base made of transparent or translucent material. An advantage associated with the realization of this object is increased aesthetic appeal of the instant lighted ornament.

It is yet another object of this invention to provide a lighted ornament which is inexpensive. Design features allowing this object to be achieved include the use of components made of readily available materials. Benefits associated with reaching this objective include reduced cost, and hence increased availability.

It is another object of the present invention to provide a lighted ornament which may be powered by a conventional Christmas light string. Design features allowing this object to be accomplished include a first tower light bore, a second tower light bore, and a base light bore all sized to frictionally admit a conventional Christmas light. A benefit associated with the accomplishment of this object is ease of use to the consumer.

BRIEF DESCRIPTION OF THE DRAWINGS

The invention, together with the other objects, features, aspects and advantages thereof will be more clearly understood from the following in conjunction with the accompanying drawings.

Two sheets of drawings are provided. Sheet one contains FIG. 1. Sheet two contains FIG. 2.

FIG. 2 is a front cross-sectional view of a lighted ornament taken at section II—II of FIG. 1.

DETAILED DESCRIPTION OF THE PREFERRED EMBODIMENT

Figure 1:
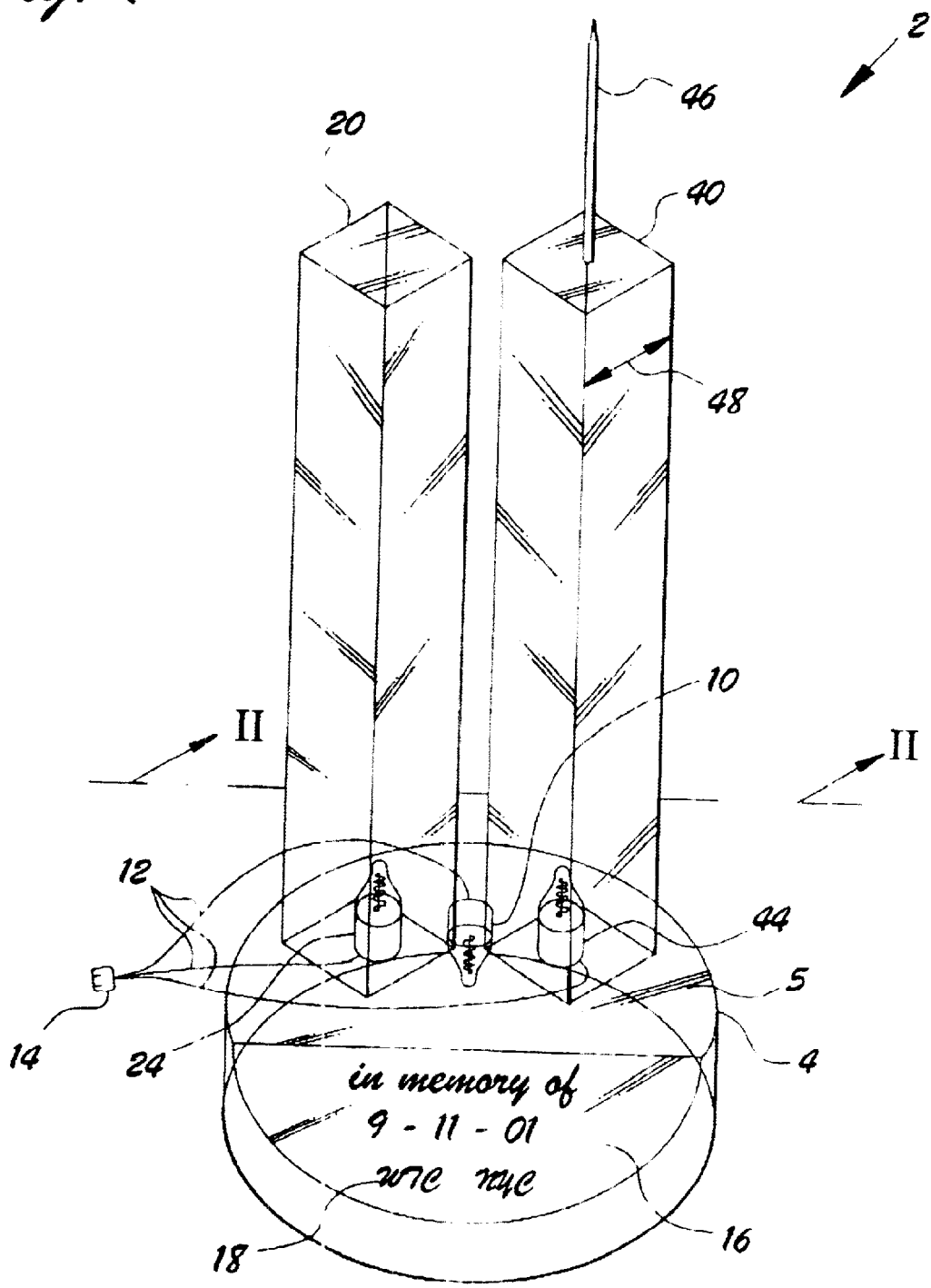
FIG. 1 is a front isometric view of a lighted ornament.

FIG. 1 is a front isometric view of lighted ornament 2. FIG. 2 is a front cross-sectional view of lighted ornament 2 taken at section II—II of FIG. 1.

Lighted ornament 2 comprises first tower 20 and second tower 40 rigidly attached to base 4. Base 4 comprises base light bore 8 sized to admit base light 10. First tower 20 comprises first tower light bore 22 sized to admit first tower light 24. Second tower 40 comprises second tower light bore 42 sized to admit second tower light 44. In the preferred embodiment, the lights were held within their respective bores by means of a frictional fit between the light and its bore, although it is considered to be within the scope of the instant disclosure that any means of holding lights within their respective bores that is known within the art may be employed.

Base light 10, first tower light 24 and second tower light 44 are electrically connected to connector 14 by means of electrical wire 12. Connector 14 may be a male connector sized to mate with a conventional female light string connector, such as may be found on a string of Christmas lights.

Base 4 may comprise base cavity 6. First tower light bore 22, second tower light bore 42 and base fight bore 8 communicate with base cavity 6, and electrical wires 12 connected to first tower light 24 and second tower light 44 may exit lighted ornament 2 through base cavity 6.

In the preferred embodiment, base 4, first tower 20 and second tower 40 were manufactured of transparent, light-transmissive material, such as clear plastic, glass, Lucite, other transparent synthetic material, or other appropriate material. Thus, the light provided by base light 10, first tower light 24 and/or second tower light 44 may be easily discerned by an observer.

In the preferred embodiment, first tower light 24 was red, base light 10 was white, and second tower light 44 was blue. In the preferred embodiment, first tower light 24, base light 10, and second tower light 44 were conventional Christmas string lights, and first tower light bore 22, base light bore 8 and second tower light bore 42 were sized to frictionally admit first tower light 24, base light 10, and second tower light 44 respectively.

Spire 46 may be disposed atop first tower 20 or second tower 40, as depicted in FIGS. 1 and 2. In the preferred embodiment, spire 46 was made of light-transmissive material such as clear plastic, glass, Lucite, other transparent synthetic material, or other appropriate material. The material of which spire 46 was made was light-transmissive material which could be clear or translucent, colored or not. Thus, due to the light-transmissive qualities of the material of which first tower 20, second tower 40, and spire 46 are made, light emanating from first tower light 24, second tower light 44, and/or base light 10, illuminated spire 46 in a manner aesthetically pleasing to an observer.

In another embodiment, first tower 20, second tower 40, and/or base 4 may be fabricated of translucent light-transmissive material, colored or not, such as plastic, glass, Lucite, other transparent synthetic material, or other appropriate material. Where first tower 20, second tower 40, and/or base 4 are manufactured of such translucent material, light transmitted from first tower light 24, second tower light 44, and/or base light 10 imbued lighted ornament 2 with a warm, filtered lighted look, which provides an aesthetically pleasing aspect to the observer.

Base 4 may further comprise base indicia flat 16 comprising base indicia 18. In the preferred embodiment, base indicia 18 was lettering commemorative of the attack on the World Trade Center on Sep. 11, 2001. Base indicia flat 16 is disposed on base upper surface 5, to which first tower 20 and second tower 40 are attached, and is disposed at an opposite side of base upper surface 5 from first tower 20 and second tower 40, and at an angle to base upper surface 5. Due to the light-transmissive nature of the material of which base 4 is made, light emanating from first tower light 24, second tower light 44, and/or base light 10 back-lights base indicia 18, thus creating a warm, aesthetic aura about base indicia 18.

The height to width ratio of the original World Trade Center towers was substantially 6.4 to 1. Thus, in the preferred embodiment, the ratio of tower height 50 to tower width 48 was 6.4±1 to 1. In an alternate embodiment lighted ornament 2, the ratio of tower height 50 to tower width 48 was 4.7±1 to one.

Another alternate embodiment of lighted ornament 2 is also illustrated in FIG. 2. In this alternate embodiment, lighted ornament 2 is provided without lights installed. Thus this alternate embodiment lighted ornament 2 comprises first tower 22 and second tower 40 rigidly attached to base 4. First tower light bore 22 is disposed within first tower 20. Second tower light bore 42 is disposed within second tower 40. Base 4 comprises base light bore 8. First tower light bore 22, second tower light bore 42, and base light bore 8 are all sized to admit a standard Christmas light string light bulb. Thus, installation of this alternate embodiment of lighted ornament 2 on a Christmas light string is simple: merely insert one each of the Christmas light string light bulbs into first tower light bore 22, second tower light bore 42, and base light bore 8. First tower light bore 22 and second tower light bore 42 may be accessible through base cavity 6. Where the color(s) of the light bulbs on the existing string of Christmas lights are not to the installer's taste, the installer can simply switch out the light bulbs for different colored light bulbs in the conventional fashion.

While a preferred embodiment of the invention has been illustrated herein, it is to be understood that changes and variations may be made by those skilled in the art without departing from the spirit of the appending claims.

DRAWING ITEM INDEX 2 lighted ornament
4 base
5 base upper surface
6 base cavity
8 base light bore
10 base light
12 electrical wire
14 connector
16 base indicia flat
18 base indicia
20 first tower
22 first tower light bore
24 first tower light
40 second tower
42 second tower light bore
44 second tower light
46 spire
48 tower width
50 tower height

I claim:

1. A lighted ornament comprising a first tower and a second tower attached to a base, said first tower comprising a first tower light bore sized to admit a first tower light, said second tower comprising a second tower light bore sized to admit a second tower light, said first tower, said second tower, and said base being made of light-transmissive material.

2. The lighted ornament of claim 1 further comprising a first tower light disposed in said first tower light bore and a second tower light disposed in said second tower light bore, said first tower light and said second tower light being electrically connected to a connector by means of electrical wire.

3. The lighted ornament of claim 2 wherein said base further comprises a base light bore sized to admit a base light, and a base light disposed within said base light bore, said base light being electrically connected to said connector by means of electrical wire.

4. The lighted ornament of claim 1 wherein said first tower, said second tower, and said base are manufactured of transparent material.

5. The lighted ornament of claim 1 wherein said first tower, said second tower, and said base are manufactured of translucent material.

6. The lighted ornament of claim 1 wherein a height to width ratio of each of the towers is 6.4±1 to 1.

7. The lighted ornament of claim 1 wherein a height to width ratio of each of the towers is 4.7±1 to 1.

8. The lighted ornament of claim of claim 3 wherein said base further comprises a base upper surface and a base indicia flat bearing base indicia, said first tower and said second tower being attached to said base at said base upper surface, said base indicia flat being disposed at a side of said base upper surface opposite said first tower and said second tower.

9. The lighted ornament of claim of claim 8 wherein said base further comprises a base cavity, said first tower light bore and said second tower light bore communicating with said base cavity, said electrical wire attached to said first tower light and to said second tower light exiting said base through said base cavity.

10. The lighted ornament of claim 8 further comprising a spire mounted atop at least one said towers, said spire being made of light-transmissive material.

11. A lighted ornament comprising a base having a base upper surface, a first tower and a second tower attached to said base upper surface, said first tower comprising a first tower light bore sized to admit a first tower light, said second tower comprising a second tower light bore sized to admit a second tower light, said first tower, said second tower, and said base being made of light-transmissive material.

12. The lighted ornament of claim 11 further comprising a base light bore in said base, said base light bore being sized to admit a base light.

13. The lighted ornament of claim 12 further comprising a first tower light in said first tower light bore, a second tower light in said second tower light bore, and a base light in said base light bore.

14. The lighted ornament of claim 13 further comprising a base indicia flat disposed at a side of said base upper surface opposite said first tower and said second tower, said base indicia flat bearing indicia, whereby due to the light-transmissive nature of material of which said base is made, light emanating from said first tower light, said second tower light, and/or said base light back-lights said base indicia, thus creating a warm, aesthetic aura about said base indicia.

15. The lighted ornament of claim 14 further comprising a spire mounted to at least one said towers, said spire being made of light-transmissive material, whereby due to the light-transmissive qualities of material of which said first tower, said second tower, and said spire are made, light emanating from said first tower light, said second tower light, and/or said base light, illuminate said spire in a manner aesthetically pleasing to an observer.

16. The lighted ornament of claim 15 wherein said base further comprises a base cavity, said first tower light bore and said second tower light bore communicating with said base cavity, said electrical wire attached to said first tower light and to said second tower light exiting said base through said base cavity.

17. A lighted ornament comprising a first tower and a second tower attached to a base, said first tower comprising a first tower light bore sized to admit a conventional Christmas light string light bulb, said second tower comprising a second tower light bore sized to conventional Christmas light string light bulb, said first tower, said second tower, and said base being made of light-transmissive material.

18. The lighted ornament of claim 17 wherein said base further comprises a base light bore sized to admit a conventional Christmas light string light bulb.

19. The lighted ornament of claim 18 wherein said first tower, said second tower, and said base are manufactured of transparent material.

20. The lighted ornament of claim 18 wherein said first tower, said second tower, and said base are manufactured of translucent material.

* * * * *